(12) United States Patent
Anand et al.

(10) Patent No.: US 7,743,046 B2
(45) Date of Patent: Jun. 22, 2010

(54) CYBERNETIC SEARCH WITH KNOWLEDGE MAPS

(75) Inventors: Kumar Anand, Andhra Pradesh (IN); Nori Kesav Vithal, Andhra Pradesh (IN); Mandaleeka Guru Prasada Lakshmi Narayana, Andhra Pradesh (IN)

(73) Assignee: Tata Consultancy Services Ltd, Point Mumbai (IN)

( * ) Notice: Subject to any disclaimer, the term of this patent is extended or adjusted under 35 U.S.C. 154(b) by 336 days.

(21) Appl. No.: 11/406,209

(22) Filed: Apr. 18, 2006

(65) Prior Publication Data
US 2006/0242113 A1 Oct. 26, 2006

(30) Foreign Application Priority Data
Apr. 20, 2005 (IN) ................ 493/MUM/2005

(51) Int. Cl.
*G06F 17/30* (2006.01)
(52) U.S. Cl. ...................... 707/709; 707/710

(58) Field of Classification Search ............ None
See application file for complete search history.

(56) References Cited

U.S. PATENT DOCUMENTS

| 6,691,106 | B1* | 2/2004 | Sathyanarayan | 707/3 |
| 2002/0138342 | A1* | 9/2002 | Clark et al. | 705/14 |
| 2004/0088283 | A1* | 5/2004 | Lissar et al. | 707/3 |
| 2005/0144162 | A1* | 6/2005 | Liang | 707/3 |

* cited by examiner

*Primary Examiner*—Pierre M Vital
*Assistant Examiner*—Truong V Vo
(74) *Attorney, Agent, or Firm*—Charles A. Muserlian

(57) ABSTRACT

A precision information collating device is disclosed. The device comprises means for inputting keywords and key phrases and defining level of traverse for establishing interlinks and interdependencies between keywords and key phrases entered and using previously stored interlinks and interdependencies to form a map. The device facilitates searching for keywords and key phrases and filtering out unwanted results, indexing, rating and posting of the result obtained and means for browsing the result.

10 Claims, 1 Drawing Sheet

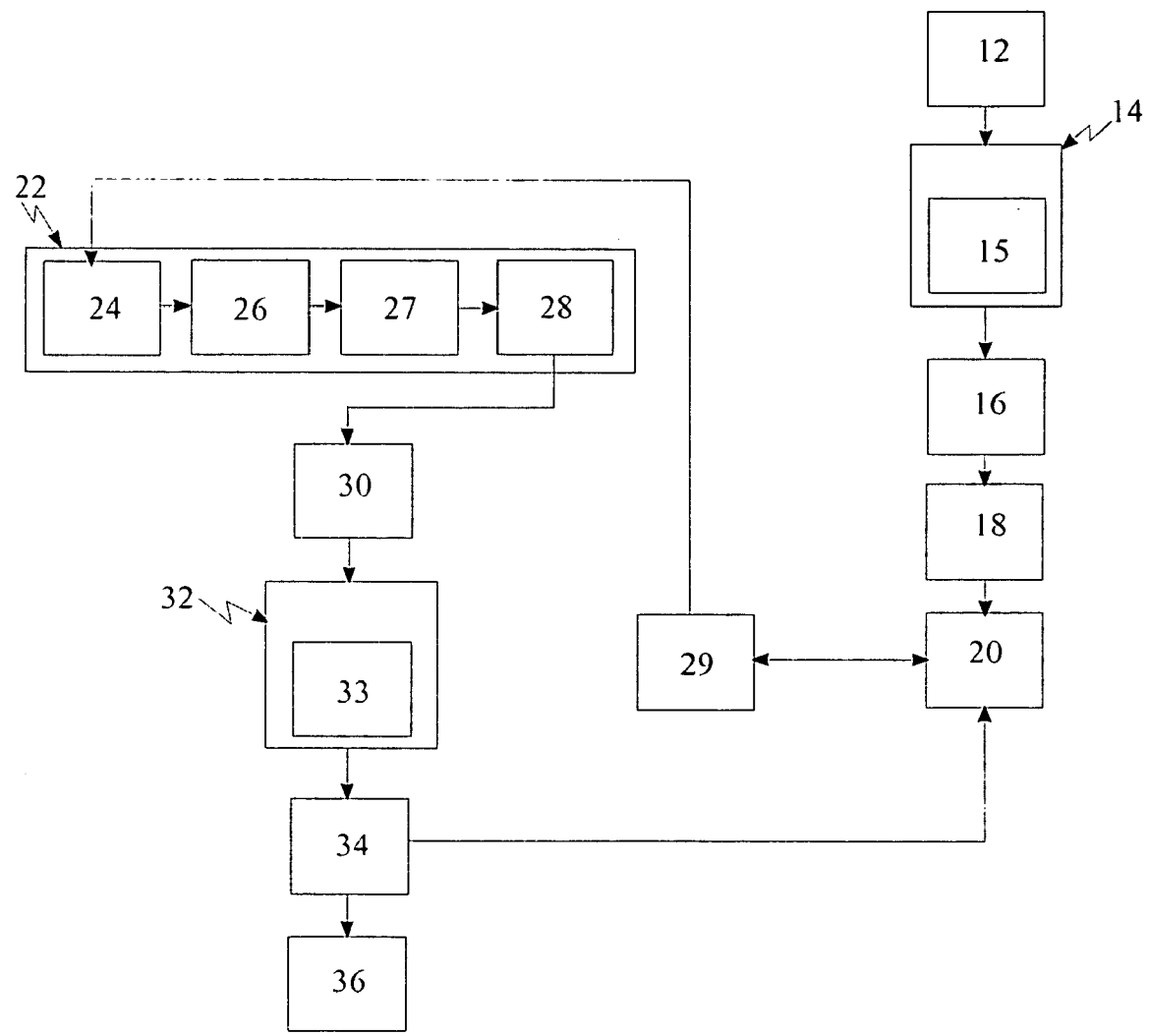

CYBERNETIC SEARCH WITH KNOWLEDGE MAPS

FIELD OF INVENTION

This invention relates to a precision information collating device.

BACKGROUND OF INVENTION

Acquiring requisite data from information stored in stand alone, intranet or internet systems is highly relevant in knowledge based industries. The contemporary search methods/tools have limitations as they are more concerned with primitive functions like searching a file in a stand alone system, intranet or internet systems and culling out a query based searches in internet environment giving voluminous information. For collection and extraction of information from internet, the main contemporary tool is a search engine. Such search engines are able to go through millions of pages and extract links/websites, which contain the requisite information in a general manner.

The main drawback of these tools is that the search tools or search engines present hundreds and thousands of links or web pages and the user is required to check the various links depending on the description made available by the search tool. The process of narrowing down one or a few relevant sites from hundreds and thousand of links and web pages is time consuming thus delaying the entire process of searching. Although some of the tools provide the facility of advance searches, the real effect of such advance searches is narrowing down the number of pages/links to be verified.

Another aspect of the traditional approach of searching using prior art search tools and search engines is that separate search tools are required for searching different resources. A single search tool cannot be used for searching information on the intranet as well as on the internet. While using separate search tools it is also necessary that the user should be aware of the functionality of all the search tools being utilized for the purpose of searching. Searching for information using different search tools each search tools using a varying range of operations and options increases the time required for searching.

Hence there was a need for a simple and efficient information collating device.

An object of this invention is to overcome the limitations of the prior art.

Another object of this invention is to provide a simple, efficient information collating device.

Another object of this invention is to provide a single information collating device for searching information on a standalone system, intranet as well as on the internet.

SUMMARY OF THE INVENTION

In accordance with this invention there is provided an information collating device for collating information available on a computer network. The network comprises a processing unit, a data storage means, inputting means and displaying means The information collating device comprises:

(i) a querying component adapted to receive a plurality of keywords and/or key phrases from a user via inputting means;

(ii) a traversing component adapted to define a level of traverse;

(iii) an inserting and modifying component adapted to insert and modify said keyword or key phrases provided to said querying component;

(iv) an expandable interlink and interdependency repository adapted to store for future use, interlinks and interdependencies between keywords and key phrases and the level of traverse needed to access the interlinks and interdependencies between individual keywords or key phrases (v) an analyzing component adapted to receive keywords, key phrases and traversing level from said querying component and said tree traversing component respectively, said analyzing component further adapted to establish new interlinks and interdependencies between keywords and key phrases depending on level of traverse and draw on stored interlinks and interdependencies of the previously created same or similar keywords or key phrases from said interlink and interdependency repository to create an analysis;

(vi) a knowledge map building component adapted to receive said analysis and create a map in said data storage means containing discrete spaces allocated to each of said keywords and/or key phrases in a one to one or one to many correspondence;

(vii) at least one data mining component adapted to mine data at different locations in said network, said data mining component comprising:
  (a) a navigational component adapted to navigate various locations in said network to search for said keywords and for key phrases;
  (b) a selector component adapted to direct said navigational component to navigate various selected locations in the network;
  (c) a crawler component adapted to scan individual items in the selected locations and further adapted to match and extract items of data from said individual data items containing at least some of said keywords and/or key phrases;

(viii) a translation component adapted to receive data from said crawler component and translate each item of the received data to a predetermined standard format;

(ix) an indexing component adapted to receive translated data from said translating component and index items in the translated data in accordance with a predetermined rating;

(x) a posting component for posting indexed rated items of translated data in at least one location in said map to form collated information; and (xi) a browsing component for browsing and viewing said collated information and interlinks in said displaying means.

Typically, said traversing means includes a computational component for altering levels of traverse of said traversing component.

Typically, said knowledge map building component builds a map in the form of a tree and said traversing component is a tree traversing component.

Typically, said data mining component is provided with a filtering component to selectively filter out unwanted data.

Typically, said computer network comprises a plurality of individual workstations.

Typically, said individual items consist of files, folders, memory storage discs, websites, mail servers, discussion forums, mailrooms, mail corners and bulletin boards.

Typically, the collating device includes an interfacing component adapted to interface said knowledge map building component with said data mining component.

Typically, said indexing component includes a rating component, which rates information found in an item according to its relevancy.

Typically, the analyzing component includes means to expand interlink and interdependency repository with additional interlink between keywords and key phrases created every time the collating device is used.

BRIEF DESCRIPTION OF THE ACCOMPANYING DRAWINGS

The invention will be described in detail with reference to a preferred embodiment. Reference to this embodiment does not limit the scope of the invention.

In the accompanying drawings:

FIG. 1 illustrates a block schematic of the precision information collating device in accordance with this invention.

DETAILED DESCRIPTION OF THE ACCOMPANYING DRAWING

The invention will now be explained with reference to FIG. 1 of the accompanying drawings.

FIG. 1 illustrates a block schematic of the information collating device in accordance with this invention. The information collating device for searching files and folders on a network is provided. The network comprises a processing unit, a data storage means, inputting means and displaying means. The collating device comprises:

(i) a querying component (12);
(ii) a traversing component (14);
(iii) an inserting and modifying component (16);
(iv) an expandable interlink and interdependency repository (17);
(v) an analyzing component (18);
(vi) a knowledge map building component (20);
(vii) a data mining component (22) comprising;
  i. a navigation component (24);
  ii. a selector component (26);
  iii. a crawler component (28);
(viii) a translating component (30);
(ix) an indexing component (32);
(x) a posting component (34); and
(xi) a browser component (36);

The collating device comprises a querying component (12), which facilitates a user to input a query to the device (10) through an inputting means. The query is input in the form of keywords or key phrases. A traversing component (14) facilitates defining level of traverse. The traversing component includes a computational component (15), which facilitates altering the levels of traverse. An inserting and modifying component (16) is provided which facilitates insertion and modifying the keywords and key phrases used while searching. An expandable interlink and interdependency repository (17) is provided for storing previously created interlinks and interdependencies between previously entered keywords and key phrases. The repository (17) also stored the level of traverse needed to access the interlinks and the interdependencies between individual keywords and key phrases. The stored interlinks and interdependencies along with levels of traverse are available to a analyzing component (18). The repository (17) is adapted to receive inputs from the analyzing component (18) and the knowledge map building component (20) for storing the interlinks and interdependencies for future use. The analyzing component (18) includes means to expand interlink and interdependency repository with additional interlink between keywords and key phrases created every time the collating device is used.

The analyzing component (18) receives inputs from the querying component (12), the traversing component (14) and the interlink and interdependency repository (17). After receiving the keywords and the level of traverse the analyzing component (18) establishes interlinks and interdependencies between keywords and key phrases depending on level of traverse. The analyzing component (18) uses the interlinks and interdependencies to create an analysis. The analysis is then received by a knowledge map building component (20). The knowledge map building component (20) creates a detailed map of the analysis received from the analyzing component (18). The map is stored in data storage means containing discrete spaces allocated to each of the keywords and/or key phrases in a one to one or one to many correspondence.

A data mining component (22) is provided which mines data from various locations in the network. The data mining component (22) comprises:

(i) a navigational component (24) for navigating various locations in the network to search for keywords and key phrases.
(ii) a selector component (26), which directs the navigational component to navigate various selected locations in the network.
(iii) a filtering component (27) to selectively filter out unwanted data.
(iv) a crawler component (28) adapted to scan individual items in the selected locations, match and extract items of data from the individual data items containing at least some of the keywords and/or key phrases.

An example of the use of the filtering component (27) is described as follows. For instance if a keyword is 'dressing' and the users intentions are to find references to food items used as dressing, then the filtering component (27) may be set to eliminate the use of the term dressing with respect to wearing of clothes or treatment of materials or medicinal treatment. The collating device includes an interfacing component (29), which interfaces the knowledge map building component with the data mining component (22).

A translation component (30) receives data from the crawler component (28) and translates each item of the received data to a predetermined standard format. When the collating device is in use and if the search to be performed is specified as a search in all locations. The result of the search may be such that one of the files may be a file on the desktop in word format. Another file may be in spreadsheet format, a third file may be on the mail server in html format and a fourth file on the internet may be in a pdf format. This data is captured by the crawler component (28) and received in the translation component (30) where the files are translated to a note pad format.

The translated data is received by an indexing component (32). The indexing component (32) indexes items in the translated data in accordance with a predetermined rating. The indexing component (32) includes a rating component (33), which rates information found in an item according to its relevancy. The indexed rated items are then given to a posting component (34). The posting component (34) posts the indexed rated items received, in at least one location in the map built by the knowledge map building component (20) to form collated information. A browsing component (36) facilitates browsing and viewing of collated information and interlinks in displaying means provided in the network.

The information collating device in accordance with this invention provides the following types of searching mechanisms:

(a) Search in a standalone system: In case of a standalone or desktop system the collating device is able to search the system files and present the information is context. Any entry through the collating device presents list of keywords and by accessing the files in user specified locations the contextual information is presented. It is possible to search the files, which were created or modified on or before a specific date. Similarly, size options may be used to look for files of a specified size or range.

(b) Intranet search: For intranet searches, it is necessary to specify the identity of the machine. It is not necessary to specify the folder location. Only those folders, which are shared by that computer, can be searched using this option. It is possible to search files, which were created or modified on or before a particular date. Similarly, size options may be used to look for files of a specified size or range.

(c) Internet searches: The search tool also works in the internet environment. The web pages available on a given topic may also be searched structurally with reference to predetermined or user determined search criteria.

(d) Domain based search: For domain based search the collating device uses knowledge maps. The knowledge maps may be used to graphically represent the keyword or key phrases to be searched. The collating device in accordance with this invention has a distinct advantage over the normal text search. The device may search the domain based on the preceding or succeeding level that is specified. The collating device searches for the relevant keywords poverty and unemployment while carrying out search for the keyword population. The relevant keywords thus enlarge the scope of cybernetic search results.

(e) Search in other locations: The collating device also provides the facility of searching in other sources such as local mail database, archives or any other mail server locations, discussion forum, mailroom, mail corner, bulletin board services where the access rights are secured. It is also possible to specify multiple servers.

While considerable emphasis has been placed herein on the various components of the preferred embodiment, it will be appreciated that many alterations can be made and that many modifications can be made in the preferred embodiment without departing from the principles of the invention. These and other changes in the preferred embodiment as well as other embodiments of the invention will be apparent to those skilled in the art from the disclosure herein, whereby it is to be distinctly understood that the foregoing descriptive matter is to be interpreted merely as illustrative of the invention and not as a limitation.

We claim:

1. An information collating device for collating information available on a computer network, said network comprising a processing unit, a data storage means, inputting means and displaying means, said collating device comprising:

(i) a querying component adapted means to receive a plurality of keywords and/or key phrases from a user via inputting means;

(ii) a traversing component adapted means to define a level of traverse;

(iii) an inserting and modifying component adapted means to insert and modify said keyword or key phrases provided to said querying component;

(iv) an expandable interlink and interdependency repository adapted means to store for future use, interlinks and interdependencies between keywords and key phrases and the level of traverse needed to access the interlinks and interdependencies between individual keywords or key phrases;

(v) an analyzing component adapted means to receive keywords, key phrases and traversing level from said querying component and said tree traversing component respectively, said analyzing component further adapted to establish new interlinks and interdependencies between keywords and key phrases depending on level of traverse and draw on stored interlinks and interdependencies of the previously created same or similar keywords or key phrases from said interlink and interdependency repository to create an analysis;

(vi) a knowledge map building component adapted means to receive said analysis and create a map in said data storage means containing discrete spaces allocated to each of said keywords and/or key phrases in a one to one or one to many correspondences;

(vii) at least one data mining component adapted means to mine data at different locations in said network, said data mining component comprising:

(a) a navigational component adapted means to navigate various locations in said network to search for said keywords and for key phrases;

(b) a selector component adapted means to direct said navigational component to navigate various selected locations in the network;

(c) a filtering component to selectively filter out unwanted data;

(d) a crawler component adapted means to scan individual items in the selected locations and further adapted to match and extract items of data from said individual data items containing at least some of said keywords and/or key phrases;

(viii) a translation component adapted means to receive data from said crawler component which receives data from the search from all locations wherein files are of different format and then translating this data to a predetermined standard format;

(ix) an indexing component adapted means to receive translated data from said translating component and index items in the translated data in accordance with a predetermined rating;

(x) a posting component means for posting indexed rated items of translated data in at least one location in said map to form collated information; and (xi) a browsing component means for browsing and viewing said collated information and interlinks in said displaying means.

2. An information collating device as claimed in claim 1, wherein said traversing means includes a computational component for altering levels of traverse of said traversing component.

3. An information collating device as claimed in claim 1, wherein said knowledge map building component builds a map in the form of a tree and said traversing component is a tree traversing component.

4. An information collating device as claimed in claim 1, wherein said data mining component is provided with a filtering component to selectively filter out unwanted data.

5. An information collating device as claimed in claim 1, said computer network comprising a plurality of individual workstations.

6. An information collating device as claimed in claim 1, wherein said individual items consist of files, folders, memory storage discs, websites, mail servers, discussion forums, mailrooms, mail corners and bulletin boards.

7. An information collating device as claimed in claim 1, which includes an interfacing component adapted to interface said knowledge map building component with said data mining component.

8. An information collating device as claimed in claim 1, wherein said indexing component includes a rating component, which rates information found in an item according to its relevancy.

9. An information collating device as claimed in claim 1, wherein the analyzing component includes means to expand interlink and interdependency repository with additional interlink between keywords and key phrases created every time the collating device is used.

10. An information collating device as claimed in claim 1, as herein described with reference to the accompanying drawings.

* * * * *